Patented July 18, 1950

2,516,071

UNITED STATES PATENT OFFICE 2,516,071

RENDERING FATS

Charles Pavia, New Market, Va., assignor to Pavia Process, Inc., Washington, D. C., a corporation of Delaware No Drawing. Application May 6, 1949,
Serial No. 91,871

18 Claims. (Cl. 260—412.6)

In my copending application Serial No. 80,780, filed March 10, 1949, I have described a method for rendering fat wherein the fat is comminuted and heated in a vessel at a temperature above the liquefaction point of the fat, the while violently agitating the comminuted mass. The method is preferably carried out by first drying the fat to increase the efficiency of the process.

In carrying out the process the comminution is made as fine as possible. Fat rendered in accordance with this process is anhydrous and of high quality.

It is theoretically possible to comminute the fat so fine that it is only necessary to raise the temperature to slightly above the liquefaction point of the fat in order to render it completely. On the average, fat tissue contains approximately 1800 fat cells per square inch. Accordingly, if the fat tissue is comminuted to a degree sufficient to rupture all the cells, it is only necessary to liquefy the fat in the cells in order to render it.

Ordinary rendering processes do not include comminution of the fat tissues. Chunks of fat are conventionally thrown in large kettles and heated. Any comminution employed is usually not smaller than 1 to 2 square inches. The heat has the effect of expanding the fat in the cellular tissue and rupturing the walls thereof, which causes the fat to be liberated. When fat is rendered in such large chunks a great deal of heat is required to rupture the cell walls because, except for those near the edges, considerable resistance to such rupturing is furnished by the mass. This resistance increases progressively toward the center of the mass. Accordingly, it is necessary to use high temperatures in the mass being rendered. Such high temperatures result not only in a rupture of the cells, but also in a chemical disintegration thereof with attendant release of water. This causes the fat to become diluted with the water, usually to the extent of about 15% and also destroys the cellular matter which would otherwise be a valuable food by-product.

The cellular residue of ordinary rendering processes is a burnt, dark brown mass, commonly referred to as "cracklings." These cracklings have very little value or use and are usually sold at a price much lower than the rendered fat or even of the unrendered fat tissue. This represents a loss to the processor and has been an important factor heretofore in net losses being suffered by many fat rendering plants, such as those forming a part of the operations of the meat packing industry.

It is an object of this invention to provide a process for rendering fat which is profitable to the processor in many ways, including time required to render the fat, equipment, quality of fat produced, and by-products of enhanced market value.

It is also an object of this invention to produce products of fat rendering processes which are novel and valuable in relation to comparable products heretofore obtained therefrom.

As indicated above, fat may be rendered by comminuting it to a size wherein substantially all the cells of the cellular tissue are ruptured and then heating the comminuted mass in a vessel at a temperature above the liquefaction point of the fat. This requires a very fine degree of comminution which is sometimes difficult to obtain on a commercial scale. I have found, however, that it is not necessary to rupture all the cells of the tissues before rendering, if the actual rendering process is controlled in a specific manner.

From the fact that fat tissue contains about 1800 fat cells per square inch, each square inch of fat will, on the average, contain about 42 rows of fat, each row consisting of 42 individual cells. Accordingly, a complete rupturing of all the fat cells would require comminuting the tissue to a particle size of about $1/42$ of an inch. Although this degree of comminution is within the scope of this invention, it is difficult to obtain it in commercial practice. I have found that satisfactory results can be obtained if the comminution is in the range of about $1/8$ to $1/32$ of an inch, $1/16$ of an inch being preferred for most commercial operations.

Fat tissue comminuted to this degree not only can be rendered very rapidly, but it also has the important property in this fine state of absorbing moisture. The cut surfaces of the tissues prevent capillaries which absorb water. By comminuting the tissue to this extent, there is provided a water absorption surface of tremendous capacity which readily withdraws water from the mass during the rendering, like a blotter or sponge.

The extent to which the water absorption surface is increased as the numerical quantity of fat cells per particle is decreased is indicated in the geometrical relationship between the volume of a cube and its surface area. The following table will illustrate this relationship more clearly:

| Particle Sizes | No. of Cells Per Particle | Surface Absorption Area of 1 Sq. Inch |
|---|---|---|
| 1″ | 76,000 | Sq. in. 6 |
| ½″ | 10,000 | 12 |
| ¼″ | 1,160 | 24 |
| ⅛″ | 145 | 48 |
| ¹⁄₁₆″ | 11.5 | 96 |
| ¹⁄₃₂″ | 2.25 | 192 |
| ¹⁄₆₄″ | .28 | 384 |

In the practice of the invention, it is preferred that the fat tissues be comminuted to a particle size where the cut surfaces are sufficient to absorb any moisture that may be in the mass or batch during the heating period.

As indicated above, fat rendered by the conventional methods results in a chemical disintegration of the tissue with release of water and the water becomes entrained with the fat and results in a rendered fat having a considerable water content. Methods have been proposed for separating the water from the fat. This is sometimes done by boiling out the water, which requires relatively high temperatures. Other methods require the addition of certain absorption agents, such as a salt. However, none of these methods are satisfactory. They require long periods of heating, extraction of dehydration chemicals used to separate the water and other involved procedures. Moreover, all the water cannot be removed. Also, considerable fat adheres to the disintegrated tissue which then requires a further processing to remove it, usually by special and expensive equipment, such as hydraulic presses. Even then, all the fat is not removed and what is removed from the burnt tissue is contaminated and of a lower quality, often useful only for the purpose of making non-edible products, such as soap.

The present invention obviates all these deficiencies by providing a process which renders fat in a few minutes, the fat being in an anhydrous condition when rendered. Also, the yield is substantially quantitative, no cracklings are obtained and no pressing is needed. Moreover, no chemical agents are needed and the resulting fat is not only pure and free of water, but is highly resistant to oxidation and rancidity, even at ordinary room temperatures, thereby making it unnecessary for many purposes to add any preservative agent such as nordihydroguiaretic acid, commonly referred to as NDGA, or any other anti-oxidant or rancidity inhibiting agent.

In general, this invention comprises comminuting the fat as aforesaid, so that each particle will contain only a small number of fat cells and the total surface area of the comminuted particles is relatively large to absorb any water from the mass during the subsequent heating. Relatively larger size particles may be tolerated if the fat tissue, either before or after comminution, is dried and chilled by cold distillation, as described in my copending application referred to above. Better and more rapid results are also obtained if the tissue is in a frozen condition before being subjected to the heat treatment.

The heat treatment comprises placing the comminuted particles in a kettle, such as a steam jacketed kettle, equipped with an agitator and maintaining the wall temperature of the kettle at a point sufficient to crack the cells of the fat tissue on contact therewith. The temperature of the mass, however, should always be kept below the chemical disintegration point of the tissue, but the wall temperature must be, at the same time, sufficiently high to provide the cracking effect. Wall temperatures of about 300° to 335° F. have proven satisfactory with most fats, temperatures in the range of 310° to 325° F. being preferred. These temperatures may be reduced correspondingly by freezing the fat prior to the heat treatment although temperatures as high as 350° F. may be employed.

Satisfactory batch temperatures are below about 200° to 180° F. and above the liquefaction point of the fat. The maintenance of this differential temperature between the wall of the kettle and the batch is effected by violently agitating the batch mass and by completing the rendering in a period of time insufficient to cause the batch as a whole to reach disintegration temperatures of the tissue.

The cooling of the batch before the heat treatment also assists in the cracking of the cells, having an effect similar to the cracking of a cold glass with hot water. Temperatures well below freezing have been used with good results.

The actual rendering of the fat in accordance with the process of this invention requires only a very short time. Satisfactory results have been obtained in about 3 to 4 minutes and usually may be accomplished in less than 10 to 15 minutes, depending upon the condition of the fat in relation to the presence of materials therein, such as meat particles, and other "foreign" matter, temperature of the fat before being placed in the kettle, degree of comminution, etc.

As soon as the fat is rendered, it is strained or filtered, preferably without the application of pressure so as to avoid exuding any water from the cellular tissue into the liquid fat. If the process is properly carried out without disintegration of the cellular tissue, the tissue will float on top of the liquid fat. In ordinary rendering processes, the cracklings or disintegrated tissues, fall to the bottom of the fat.

The filtered fat, in accordance with this invention, is clear and anhydrous and can be stored at room temperatures for long periods of time, without becoming rancid. For example, it is not unusual for fat rendered in accordance with this process to remain rancid free after eight months without any precautionary measures. Stored in a cool place and in a light excluded area, it may keep for several years in a rancid free condition.

The residue of cellular tissue is of a light color in contrast to the ordinary dark brown color of cracklings. The residue of the present process is essentially proteinaceous, since the molecules have not been broken down as in the case of cracklings and, therefore, is of high nutritional value. It can be used as a food product for human consumption as well as for animal feed and fertilizer. It may be preserved in any of the usual ways known for preserving protein products, such as canning, dehydration, chemical treatment, such as disclosed in United States Patent No. 2,349,836.

The following examples will illustrate the invention, but it is to be understood that the scope of the invention is not limited thereto.

*Example 1*

30¼ lbs. of hog leaf fat was ground to a particle size of $\frac{1}{16}$ of an inch and chilled in a mechanical refrigerator over night. The fat was placed in a steam jacketed kettle and a gauge pressure of 78 lbs. of saturated steam applied to the jacket. The batch was kept in a violent state of agitation and the steam was turned off after one minute had elapsed. Five minutes later, the steam was turned on to a gauge pressure of 20 pounds per square inch and turned off again after 5 more minutes had elapsed. The agitation was continued for 2 additional minutes. The batch was then filtered through a fresh cotton fabric and produced 26¼ lbs. of rendered fat, a yield of 86.77%. The residue was a light proteinaceous mass, substantially free of fat and suitable for admixture with cooked cereals as a food. When fried, the protein material has the taste and consistency of bacon chips.

Example 2

34 lbs. of beef gut fat was placed in the same kettle as in Example 1 and 70 lbs. of steam pressure turned on, the while violently agitating the mass. Two minutes later, the steam was turned off and after the elapse of an additional two minute period, the batch was filtered as in Example 1. 26¼ lbs. of clear fat was recovered giving a yield of 77.21%.

In both of the above examples, some of the fat was absorbed by the filter medium which reduced the yield somewhat from that which would otherwise have been obtained.

I claim:

1. The process of rendering fat comprising comminuting fat tissue, passing the comminuted particles in contact with a heated surface at a temperature above about 300° F. momentarily, but for a period of time sufficient to rupture the cells of the fat tissue without chemically disintegrating the cellular tissue substantially, whereby the fat becomes released from the cells of the tissue and the ruptured tissue retains its normal water absorbent characteristic, maintaining the fat in contact with the ruptured cells to effect absorption of water from the fat by said ruptured cells and causing the water swollen tissue to float to the surface of the released fat, and then separating the released fat from the water swollen tissue.

2. The process of rendering fat in accordance with claim 1, wherein the fat prior to heating is in a frozen condition.

3. The process of rendering fat according to claim 1 in which the fat tissues prior to rendering the fat therefrom has been dried.

4. A process as defined by claim 1 in which the fat tissue has been comminuted to a particle size in the range of ⅛ to 1/32 of an inch.

5. A process as defined by claim 1 in which the fat tissue has been comminuted to a particle size of about 1/16 of an inch.

6. The process of rendering fat comprising comminuting fat tissue at a temperature below the liquefaction point of the fat in the tissue to a particle size in the range of about ⅛ to 1/42 of an inch, passing the comminuted particles in contact with a heated surface at a temperature above about 300° F. for a period of time sufficient to rupture the cells of the fat tissue, but insufficient to chemically disintegrate the cellular tissue substantially, whereby the fat becomes released from the cells of the tissues, and the ruptured tissue retains its normal water absorbent characteristic, maintaining the fat in contact with the ruptured cells to effect absorption of water from the fat by said ruptured cells and causing the water swollen tissue to float to the surface of the released fat and then separating the released fat from the water swollen tissue.

7. The process of rendering fat comprising comminuting a mass of fat tissue, subjecting the comminuted fat particles to instantaneous heat in the range of about 300° to 350° F. without increasing the general temperature of the mass above about 180° to 200° F., whereby the fat is released from the cells, and then separating the released fat from the tissue.

8. The process of rendering fat comprising comminuting a mass of fat tissue to a particle size in the range of about ⅛ to 1/42 of an inch, subjecting the comminuted particles to heat in the range of about 300° to 350° F. without increasing the general temperature of the mass above about 180° to 200° F., whereby the fat is released from the cells, and then separating the released fat from the tissue.

9. The process of rendering fat from fat tissue comprising comminuting the fat tissue at a temperature below the liquefaction point of the fat in the tissue, passing the comminuted tissue in contact with a heated surface at a temperature above about 300° F. and for a period of time sufficient to rupture the cells, but insufficient to chemically disintegrate the cellular tissue substantially, whereby fat becomes released from the cells of the tissue and the ruptured tissue retains its normal water absorbent characteristic, maintaining the fat in contact with the ruptured cells to effect absorption of water from the fat by said ruptured cells and causing the resulting water swollen tissue to float to the surface of the released fat, and then separating the released fat from the ruptured cells.

10. The process of rendering fat from fat tissue comprising comminuting the fat tissue at a temperature below the liquefaction point of the fat in the tissue, passing the comminuted tissue in contact with a heated surface at a temperature above about 300° F. and for a period of time sufficient to mechanically rupture the cells by heat alone, but insufficient to chemically disintegrate the cellular tissue substantially under the action of the heat, whereby fat becomes released from the cells of the tissue and the ruptured cells retain their normal water absorbent characteristic, maintaining the released fat in contact with the ruptured cells to effect absorption of water from the fat by said ruptured cells, and then separating the released fat from the ruptured cells.

11. The process of rendering fat from fat tissue comprising comminuting the fat tissue and mechanically rupturing the fat cells by placing them in contact with a heated surface having a temperature sufficiently high to mechanically rupture the fat cells of the tissue on contact therewith by differential thermal expansion of the cells and thereby releasing fat from the ruptured cells, then promptly removing the ruptured cells from the heated surface to a region of lower temperature to prevent destruction of the normal water absorption properties of the ruptured cellular tissue, maintaining the cellular tissue in contact with the released fat and thereby absorbing substantially all water from the fat, and then separating the released fat from the cellular tissue containing the absorbed water.

12. The process of rendering fat from fat tissue comprising drying and chilling the fat tissue, comminuting the fat in its chilled condition, placing the comminuted fat in a hot zone having a temperature sufficiently high to mechanically rupture the fat cells of the tissue on contact therewith by differential thermal expansion of the cells and thereby release fat from the cells, then promptly removing the ruptured cells from the hot zone to a region of lower temperature to prevent destruction of the normal water absorption properties of the cellular tissue, maintaining the cellular tissue in contact with the released fat to absorb water therefrom, and then separating the released fat from the cellular tissue containing the absorbed water.

13. The process of rendering fat from fat tissue comprising drying and chilling the fat tissue by cold distillation, comminuting the fat in its chilled condition, placing the comminuted fat in a hot zone having a temperature sufficiently high to mechanically rupture the fat cells of the tissue on contact therewith by differential thermal expansion of the cells and thereby release fat from the cells, then promptly removing the ruptured cells from the hot zone to a region of lower temperature to prevent destruction of the normal water absorption properties of the cellular tissue, maintaining the cellular tissue in contact with the released fat to absorb water therefrom, and then separating the released fat from the cellular tissue containing the absorbed water.

14. The process as defined by claim 11 in which the temperature of the heated surface is in the range of about 300° to 350° F.

15. The process as defined by claim 11 in which the temperature of the heated surface is in the range of about 300° to 335° F.

16. The process as defined by claim 11 in which the temperature of the heated surface is in the range of about 310° to 325° F.

17. A batch process for rendering fat from fat tissue comprising comminuting the fat tissue and placing a batch thereof in a vessel, maintaining the wall of the vessel at a temperature in the range of about 300° to 350° F. the while violently agitating the batch so as to continuously withdraw portions of the batch adjacent the wall of the vessel to a region of lower temperature, continuing the operation until the fat becomes released from the cellular tissue and the normal water absorption characteristic of the cellular tissue causes it to become water-swollen by absorption of water from the released fat, removing the fat and the water swollen tissue from the vessel before the temperature of the batch increases to the point where the cellular tissue would be substantially disintegrated chemically, and then separating the fat from the water-swollen cellular tissue.

18. A batch process for rendering fat from fat tissue comprising comminuting the fat tissue and placing a batch thereof in a vessel, maintaining the wall of the vessel at a temperature in the range of about 300° to 350° F. the while violently agitating the batch so as to continuously withdraw portions of the batch adjacent the wall of the vessel to a region of lower temperature, continuing the operation until the fat becomes released from the cellular tissue and the normal water absorption characteristic of the cellular tissue causes it to become water-swollen by absorption of water from the released fat, removing the fat and the water-swollen tissue from the vessel before the temperature of the batch exceeds a temperature of about 200° F., and then separating the fat from the water-swollen cellular tissue.

CHARLES PAVIA.

REFERENCES CITED

The following references are of record in the file of this patent:

UNITED STATES PATENTS

| Number | Name | Date |
|---|---|---|
| Re. 6,737 | Andrew | Nov. 16, 1875 |
| 137,564 | Paraf | Apr. 8, 1873 |
| 153,999 | Andrew | Aug. 11, 1874 |
| 280,822 | Hobbs | July 10, 1883 |
| 1,394,736 | Kamrath | Oct. 25, 1921 |
| 1,760,059 | Hiller | May 27, 1930 |
| 2,388,284 | Ratner | Nov. 6, 1945 |
| 2,413,692 | Crowther | Jan. 7, 1947 |

FOREIGN PATENTS

| Number | Country | Date |
|---|---|---|
| 157,822 | Great Britain | Appl. Jan. 10, 1921 (Complete not accepted) |
| 212,461 | Great Britain | Mar. 13, 1924 |
| 495,926 | Great Britain | Nov. 22, 1938 |
| 507,742 | Great Britain | June 20, 1939 |